(12) United States Patent
Rupp et al.

(10) Patent No.: US 10,429,220 B2
(45) Date of Patent: Oct. 1, 2019

(54) MAGNETO-INDUCTIVE FLOW MEASURING DEVICE

(71) Applicant: Endress + Hauser Flowtec AG, Reinach (CH)

(72) Inventors: Stefan Rupp, Schallstadt (DE); Thomas Sulzer, Basel (CH); Wolfgang Brobeil, Weil am Rhein (DE); Oliver Popp, Oberwil (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 115 days.

(21) Appl. No.: 15/537,897

(22) PCT Filed: Dec. 3, 2015

(86) PCT No.: PCT/EP2015/078535
§ 371 (c)(1),
(2) Date: Jun. 20, 2017

(87) PCT Pub. No.: WO2016/102168
PCT Pub. Date: Jun. 30, 2016

(65) Prior Publication Data
US 2018/0017419 A1    Jan. 18, 2018

(30) Foreign Application Priority Data
Dec. 22, 2014  (DE) .......................... 10 2014 119 451

(51) Int. Cl.
*G01F 1/58*        (2006.01)
(52) U.S. Cl.
CPC .................... *G01F 1/588* (2013.01)

(58) Field of Classification Search
CPC ....................................................... G01F 1/588
See application file for complete search history.

(56) References Cited

U.S. PATENT DOCUMENTS

| 4,899,592 A | 2/1990 | Behrens |
| 5,280,727 A | 1/1994 | Hafner |
| (Continued) | | |

FOREIGN PATENT DOCUMENTS

| CN | 101788312 A | 7/2010 |
| DE | 102006060442 A1 | 6/2008 |
| (Continued) | | |

OTHER PUBLICATIONS

Machine translation of JP 04295722.*
(Continued)

*Primary Examiner* — David J Bolduc
(74) *Attorney, Agent, or Firm* — Bacon & Thomas, PLLC

(57) ABSTRACT

A magneto-inductive flow measuring device comprising a measuring tube on which a magnet system and two or more measuring electrodes are arranged and/or secured. The measuring tube has in- and outlet regions with a first cross section and the measuring tube has between the in- and outlet regions a middle segment, which has a second cross section. The measuring electrodes are arranged in the middle segment of the measuring tube and the middle segment at least in the region of the measuring electrodes is surrounded by a tube holder, which guards against cross-sectional deformation of the second cross section.

13 Claims, 3 Drawing Sheets

(56) References Cited

U.S. PATENT DOCUMENTS

| | | | |
|---|---|---|---|
| 7,228,748 B2* | 6/2007 | Keech | G01F 1/588 73/861.12 |
| 7,661,294 B2* | 2/2010 | Dam | A61M 1/3626 250/343 |
| 8,286,502 B2 | 10/2012 | Pelayo | |
| 8,286,503 B2 | 10/2012 | Neuburger | |
| 8,694,271 B2* | 4/2014 | Dam | G01N 29/024 702/108 |
| 8,844,359 B2* | 9/2014 | Dam | G01N 29/024 73/597 |
| 9,091,574 B2 | 7/2015 | Neven | |
| 9,395,220 B2 | 7/2016 | Reichart | |
| 9,689,727 B2* | 6/2017 | Kissling | G01F 1/662 |
| 2006/0213284 A1* | 9/2006 | Visser | G01F 1/58 73/861.12 |
| 2008/0011060 A1* | 1/2008 | Lynnworth | G01N 29/024 73/64.53 |
| 2008/0060447 A1* | 3/2008 | Lincoln | G01F 1/586 73/861.12 |
| 2008/0257064 A1* | 10/2008 | Nielsen | G01F 1/58 73/861.12 |
| 2010/0132478 A1 | 6/2010 | Pelayo | |
| 2013/0305839 A1 | 11/2013 | Muench | |
| 2015/0300861 A1* | 10/2015 | Regen | G01F 1/58 73/37 |
| 2018/0017419 A1 | 1/2018 | Rupp | |

FOREIGN PATENT DOCUMENTS

| | | |
|---|---|---|
| DE | 102009001413 A1 | 9/2010 |
| DE | 102012213507 B3 | 8/2013 |
| DE | 102014119451 A1 | 6/2016 |
| EP | 2187180 A2 | 5/2010 |
| EP | 2196779 A1 | 6/2010 |
| EP | 2600119 A1 | 6/2013 |
| JP | H04295722 A | 10/1992 |
| JP | 2004177200 A | 6/2004 |
| WO | 2010069869 A1 | 6/2010 |

OTHER PUBLICATIONS

German Search Report, German Patent Office, Munich, DE, dated Sep. 23, 2015.
International Search Report, EPO, The Netherlands, dated Jun. 10, 2016.
Chinese Office Action in corresponding Chinese Application No. 201580069896.1, dated Jan. 11, 2019.

* cited by examiner

MAGNETO-INDUCTIVE FLOW MEASURING DEVICE

TECHNICAL FIELD

The present invention relates to a magneto-inductive flow measuring device.

BACKGROUND DISCUSSION

Flow measuring devices are differentiated according to various criteria. The most widely used differentiating criterion is that based on measuring principle. Correspondingly, e.g. Coriolis flow measuring devices, ultrasonic, flow measuring devices, thermal, flow measuring devices, vortex, flow measuring devices, magneto-inductive flow measuring devices, SAW (surface acoustic wave) flow measuring devices, V-cone flow measuring devices and suspended body flow measuring devices are known. Corresponding flow measuring devices are available from the applicant or others. In the present case, of concern is especially a magneto-inductive flow measuring device.

A further differentiating feature concerns whether the flow measuring device has a measuring tube or whether the flow measuring device can be placed or built on a conventional pipeline, or process line, without interrupting the flow of medium within the pipeline for the installation of the flow measuring device. Typical ultrasonic measuring devices of this type are so-called clamp-on ultrasonic, flow measuring devices. Flow measuring devices with measuring tubes are known as inline flow measuring devices.

For quite some time, inline flow measuring devices have been known, which are built with measuring tubes having a reduced cross section. A corresponding measuring tube is shown, for example, in U.S. Pat. No. 4,899,592.

Predominantly, concepts for measuring tubes with reduced cross section utilize measuring tubes involving a metal tube and an internally situated, plastic liner. For a uniform liner thickness, the liner must either especially be cast or inserted already preformed into the measuring tube on both sides and then centrally welded. This leads to a higher manufacturing effort and, in given cases, to measurement deviations.

Known additionally are plastic tubes, e.g. of polyethylene or polyamide, which can be used as measuring tubes in magneto-inductive flow measuring devices. Fundamentally, the application of plastic tubes is, however, limited, since they expand or contract with change of the pressure of the medium. A change of the diameter of a measuring tube causes a measurement error. In the case of a measuring tube with reduced cross section, the widening tendency would be even greater in the region of the reduced cross section.

U.S. Pat. No. 8,286,503 provides for solving this problem stiffening ribs, which enable a stabilizing of the measuring tube cross section.

SUMMARY OF THE INVENTION

Starting from the known state of the art, an object of the present invention is to provide a magneto-inductive flow measuring device having a measuring tube with reduced cross section, which is simple and cost effective to manufacture and in the case of which smaller measurement errors occur in the presence of pressure fluctuations.

The present invention achieves this object by a magneto-inductive flow measuring device which comprises a measuring tube, on which a magnet system and a plurality of measuring electrodes are arranged or secured. Usually, the measuring electrodes, with which an induced voltage is sensed, lie on diametrically opposite sides of the measuring tube. There are, however, also other structural variants known. Especially, additional measuring electrodes can be arranged peripherally distributed on the measuring tube or in the case of incompletely filled measuring tubes then in the lower region of the measuring tube. Also a plurality of measuring electrodes can be arranged pairwise one after the other. In the course of the developmental history of magneto-inductive flow measuring devices, a large number of other arrangements have been disclosed.

A magnet includes in the most common construction two diametrically oppositely lying field coils, whose connecting axis is arranged perpendicular to the measuring tube axis and to the measuring electrodes axis.

A magneto-inductive flow measuring device of the invention includes a measuring tube on which are arranged and/or secured a magnet system and at least two or more measuring electrodes. Measuring electrodes are most often embodied stylus-shaped and connected directly or indirectly with the measuring tube wall. Known also, however, are metal segments cast in the measuring tube, which serve as measuring electrodes, or also annular electrodes.

The measuring tube includes in- and outlet regions with a first cross section. In these regions, there occurs, additionally, the connection of the measuring tube to a process line. The in- and outlet regions have, in most cases, a circularly round cross section. There are, however, also, in rare cases, polygonal, thus e.g. rectangular or triangular, process lines and the out- and inlet regions are correspondingly embodied.

The measuring tube of the invention includes a middle segment between the in- and outlet regions, which has a second cross section. This middle segment serves for flow conditioning and can enable a lessening of the straight inlet path before the actual flow measuring device.

The measuring electrodes are arranged in the middle segment of the measuring tube. The middle segment is, according to the invention, at least in the region of the measuring electrodes surrounded by a tube holder, which guards against cross-sectional deformation of the second cross section.

The tube holder totally surrounds and grips around the measuring tube in the middle segment, preferably over the entire periphery. In such case, the tube holder does not, however, have to extend over the entire length of the middle segment, as measured parallel to the longitudinal axis of the measuring tube. Since it serves mainly to prevent change of the separation of the measuring electrodes, the tube holder should, however, be arranged at least in the region of the measuring electrodes and support the measuring tube in this region. This aforementioned region begins preferably no more than 2 cm, preferably less than 1 cm, from the measuring electrodes.

In this way, a pressure dependent widening of the measuring tube by pressures of the medium in the region of the connecting axis of the measuring electrodes is safely prevented and a constant separation of the measuring electrodes assured.

It is advantageous, when the magnet system is arranged and/or secured at or on the tube holder. Therewith, a compact construction can be implemented. To the extent that the tube holder is of magnetically conductive metal, a pole shoe can be omitted, since the tube holder can assume the functionality of the pole shoe.

It is advantageous, when the middle segment has at least two oppositely lying planar surfaces, which act as bearing surfaces for the magnet system. This assures a simple mounting of the magnet system.

The cross-sectional form should be guaranteed over a large range of pressures of the medium. In an embodiment, consequently, the tube holder can be of at least two planar plates, which are connected with one another. The plates can especially be of metal.

The plates can extend beyond the planar surfaces at least in certain regions. Securement means, e.g. bolts, can be located at these protruding locations.

An especially high strength tube holder results when the planar plates are connected with one another by means of bolts.

Ideally, the tube holder completely encloses the middle segment.

It is especially advantageous, when the measuring tube is a plastic measuring tube. On the one hand, the geometry of the cross sectional narrowing in the middle segment can already be accomplished in the molding of the tube, and, on the other hand, this is where the tube holder is especially advantageous, since completely plastic tubes are in danger of pressure related cross-sectional changes. Examples of plastics for the measuring tube include preferably polyethylene, polyamide, polypropylene and/or polyvinyl chloride.

It is especially advantageous, when each of the plates has a thickness, which corresponds at least to the wall thickness of the measuring tube. Advantageously, the planar plates are arranged only, thus exclusively, between the magnet system and the measuring tube. Then, e.g. field guiding sheet metal pieces can be omitted.

The middle segment can especially advantageously have a minimum diameter $d_{min}$, and a maximum cross section $d_{max}$, wherein $d_{min}$ is at least 20% smaller, preferably at least 50% smaller, than $d_{max}$.

BRIEF DESCRIPTION OF THE DRAWINGS

The invention will now be explained in greater detail based on the appended drawing illustrating an example of an embodiment. The figures of the drawing show as follows.

DETAILED DISCUSSION IN CONJUNCTION WITH THE DRAWINGS

The construction and measuring principle of a magneto-inductive flow measuring device are basically known. In Faraday's law of induction, a voltage is induced in a conductor, which moves in a magnetic field. In the case of the magneto-inductive measuring principle, flowing measured material corresponds to the moved conductor. A magnetic field of constant strength is produced by a magnet system. Such can preferably be two field coils, which are arranged diametrically opposite one another on the measuring tube at equal location along the measuring tube axis A of a measuring tube. Located perpendicularly thereto on the tube inner wall of the measuring tube are two or more measuring electrodes, which sense the voltage produced when the measured substance is flowing. The induced voltage is proportional to the flow velocity and therewith to the volume flow. The magnetic field of the field coils is produced by a clocked direct current of changing polarity. This assures a stable zero-point and makes the measuring insensitive to influences of multiphase materials, inhomogeneities in the liquid or low conductivity. Known are magneto-inductive flow measuring devices with coil arrangements with more than two field coils and other geometrical arrangements. The applicant has manufactured magneto-inductive flow measuring devices in different dimensions and embodiments, for example, under the mark "Promag" for a number of years.

The above-described flow measuring device represents one of the most common designs. However, known are also magneto-inductive flow measuring devices with more than two field coils and more than two measuring electrodes.

Figure 4:
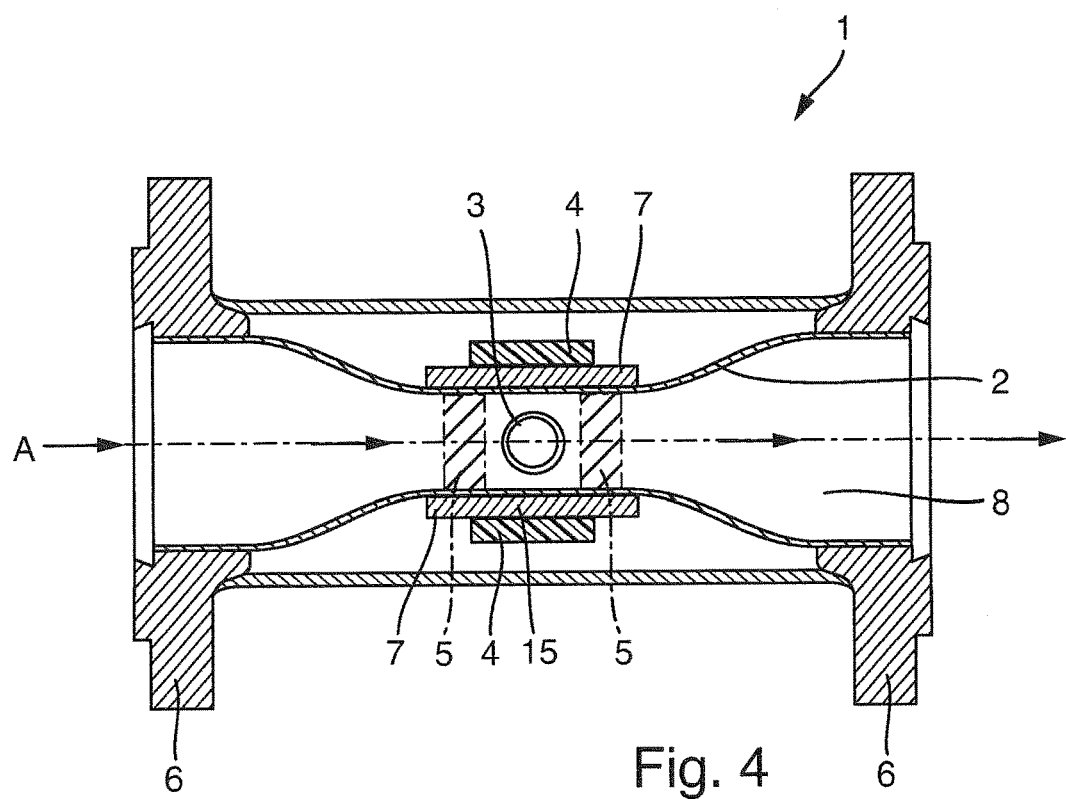
FIG. 4 is a schematic sectional view of a magneto-inductive flow measuring device of the invention.

FIG. 4 shows a magneto-inductive flow measuring device 1 with a plastic tube 2, which has a measuring tube axis A. The plastic tube can be embodied of a material usual for tubular construction. Especially polyethylene or polyamide based plastics form examples.

The support tube 3 includes, on its ends, flanges 6, which have, in each case, at least one connection surface. This connection surface serves for connection to a process pipe of a process line, which is not shown in FIG. 1.

Figure 1:
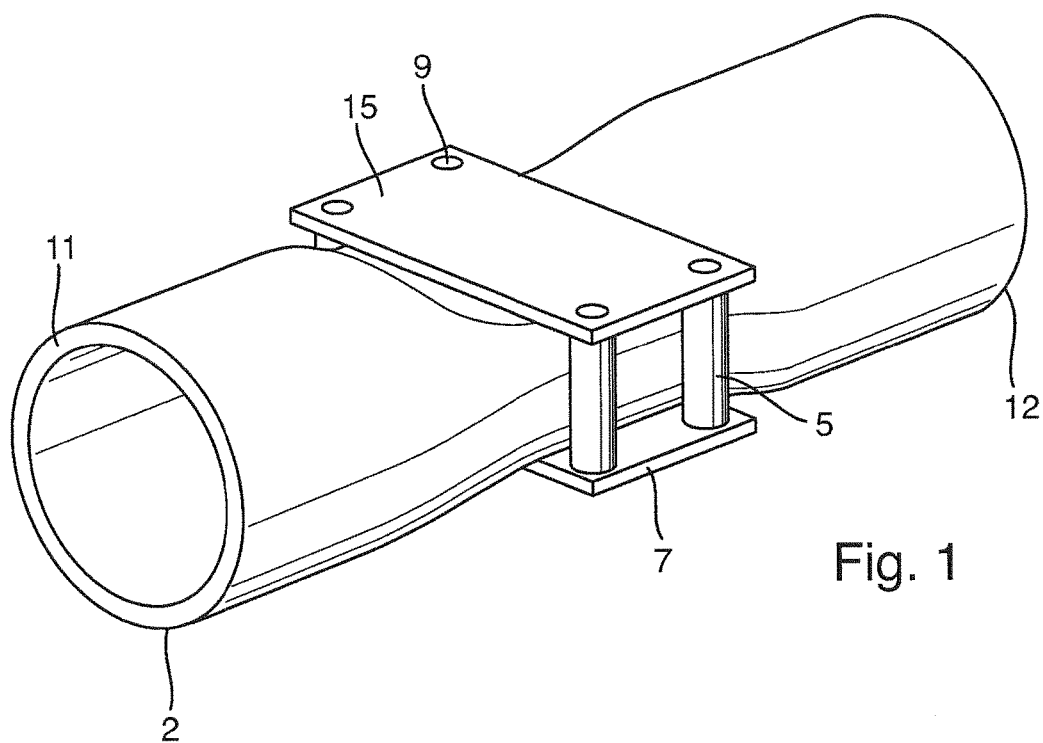
FIG. 1 is a perspective view of a measuring tube of a magneto-inductive flow measuring device.
Figure 2:
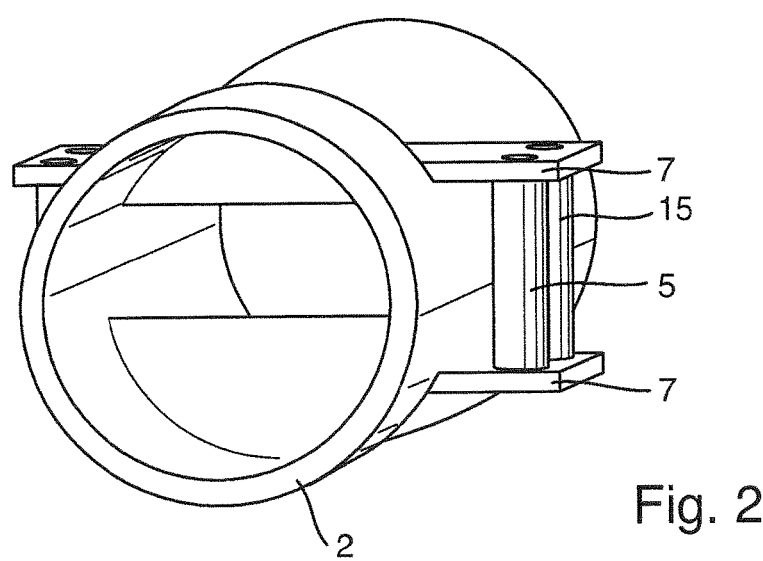
FIG. 2 is an end view of a measuring tube of a magneto-inductive flow measuring device.
Figure 3:
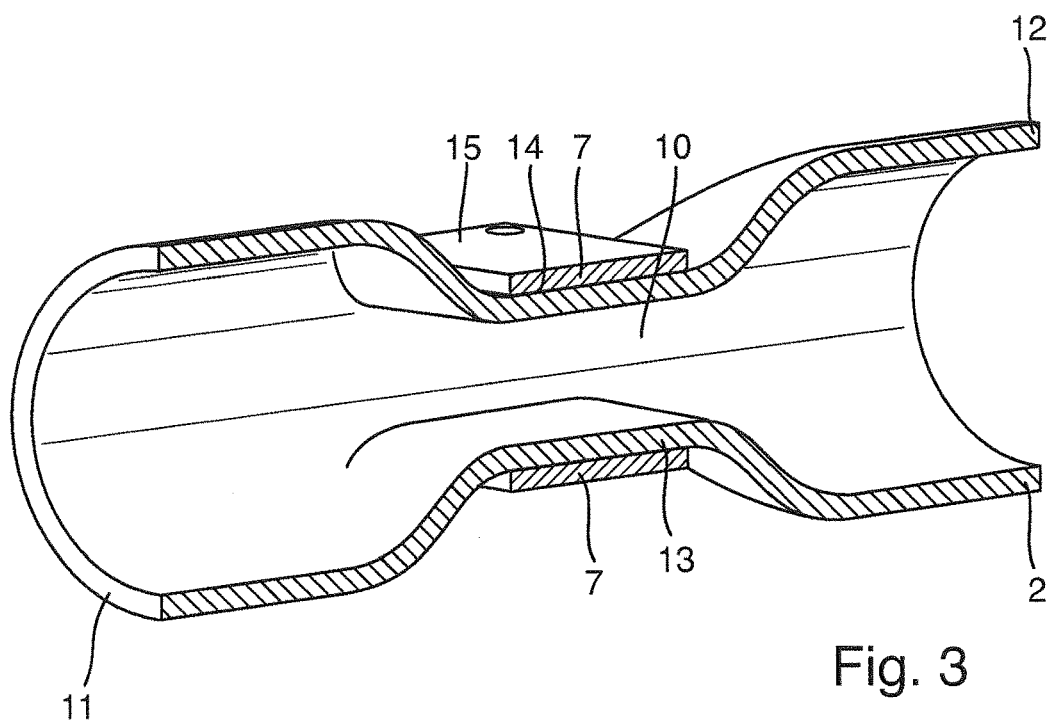
FIG. 3 is a lateral sectional view taken along the longitudinal axis of the measuring tube.

The magneto-inductive flow measuring device includes additionally a measuring tube 2, which is shown in greater detail in FIGS. 1-3.

Measuring tube 2 has in its inlet- and outlet regions 11 and 12 preferably a circularly round cross section. This cross section changes over the length of the measuring tube 2.

The tube includes, in such case, a middle segment 10, in which a minimum tube diameter is at least 20%, preferably 50%, smaller than the tube diameter in the inlet region 11 or outlet region 12. The maximum tube diameter is at least 20%, preferably 50%, larger than the minimum tube diameter.

The medium exerts a certain pressure on the measuring tube. Especially intensive is this pressure of the medium in the region of the narrowing, thus in the middle segment 10. Exactly in the case of measuring tubes of plastic, a cross-sectional widening is often observable already at medium pressures of 3 bar or higher. This is a basic problem, since the separation of the measuring electrodes 3 is changed in the case of a cross-sectional widening, whereby defective measurements occur. Cross sectional narrowing enlarges this problem supplementally. In order to resist pressure related cross-sectional widening of the cross section of the middle region, the measuring tube includes a tube holder, which, in a concrete example, is a plates-bolts construction. However, depending on tube form, also other structural options are possible.

The cross sectional narrowing is shown only schematically in FIGS. 1-4. The cross sectional narrowing can e.g also involve a rectangular cross section.

A corresponding manufacture of the measuring tube can occur by deformation, such as explained in the following:

First, a plug is inserted into a plastic tube of constant, circularly round cross section along the measuring tube axis. The plug has an outer contour, which the lumen of the measuring tube should assume in the deformed middle segment. The plug can be formed e.g. of two halves, which are brought together in the middle.

The pipe is then pressed onto the plug. This is done preferably hot, e.g. at temperatures above 100° C.

Formed in the deformation procedure are, preferably, planar surfaces 13 and 14. In such case, the surface normals of the two planes preferably coincide or extend parallel to one another.

Arranged on the wall of the plastic tube at least in the region of the planar surfaces 13 and 14 is a stiffening ply.

This stiffening ply is preferably embodied only in the region, in which the planar surfaces extend.

The stiffening ply can in FIGS. 1-3 comprise two mutually parallel, planar plates 7. These planar plates 7 are preferably embodied of a solid metal, especially steel. They can also alternatively be a number of pieces of sheet metal, e.g. steel sheet, layered on top of one another.

The planar plates lie in FIGS. 1-3 against the planar surfaces 13 and 14 of the plastic tube 2 and are connected with one another by bolts 5.

The bolts 5 and the planar plates 7 are connected with the wall of the plastic tube by force interlocking, e.g. frictional interlocking. They can, for example, lie directly against the plastic tube. There can, however, also be other intermediate plies arranged between the plastic tube 2 and the plates 7.

Alternatively to the plates and bolts 5 and 7, also a metal band or a number of metal bands can be used for stabilizing the region 10.

The stiffening ply is, in such case, preferably arranged exclusively in the region 10, in which the planar surfaces 13 and 14 extend.

The above-described measuring tube 2 can then be applied in a magneto-inductive measuring device. This is shown in FIG. 4.

Arranged on each stiffening plate 7 is a magnet system. This magnet system includes in FIG. 4 two magnet coils which lie diametrically opposite one another on the planar plates 7. The magnet system produces a magnetic field.

Arranged 90° offset to the magnet system are two measuring electrodes 3, which are located diametrically opposite one another on the measuring tube.

In the case of increased pressure from the measured medium 8, there occurs because of the force interlocking connection of the stiffening ply with the plastic tube no or only a greatly lessened widening of the separation of the measuring electrodes and of the separation of the magnet coils.

In this way, there can be applied in cases, in which a reduced cross section is implemented, a plastic tube instead of a metal tube with liner. The corresponding measuring tube fulfills additionally the requirements regarding diffusion density, mechanical strength and electrical insulation needed for the measuring principle, so that the manufactured measuring tube has no disadvantages compared with other conventional measuring tubes for magneto-inductive flow measuring devices.

Figure 5:
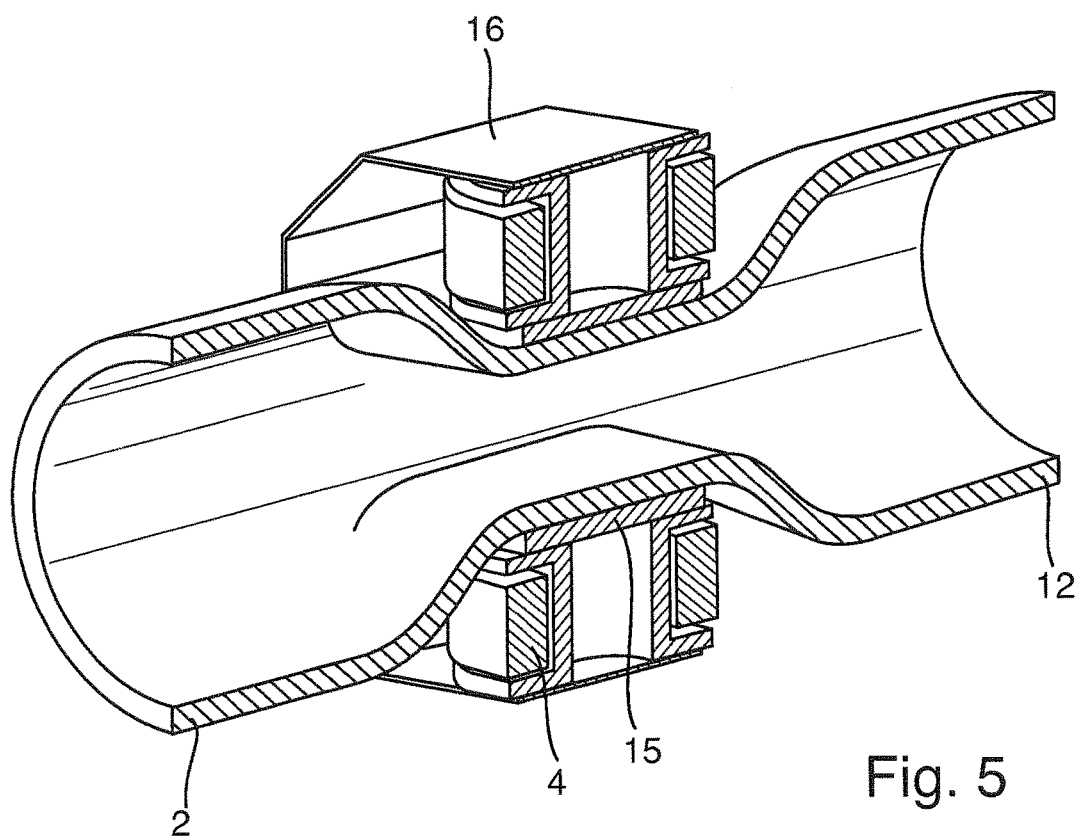
FIG. 5 is a schematic detail view of the flow measuring device of the invention.

FIG. 5 shows a more detailed construction of the magneto-inductive flow measuring device with the field coils 4 set on the tube holder 15 and sheet metal 16 arranged on the field coils for guide back of the field. The measuring electrodes are not shown in FIG. 5, in order to simplify the illustration.

The invention claimed is:

1. A magneto-inductive flow measuring device, comprising:
    a measuring tube;
    on which a magnet system and two or more measuring electrodes are arranged and/or secured, wherein:
    said measuring tube has inlet and outlet regions with a first cross section;
    said measuring tube has a middle segment located between said inlet and outlet regions and having a second cross section;
    said measuring electrodes are arranged in said middle segment of said measuring tube;
    said measuring tube is a plastic measuring tube;
    said middle segment at least in the region of said measuring electrodes is surrounded by a tube holder, which guards against cross-sectional deformation of said second cross section; and
    said tube holder is composed of at least two plates, which are connected with one another.

2. The magneto-inductive flow measuring device as claimed in claim 1, wherein:
    said magnet system comprises field coils, is arranged and/or secured at or on said tube holder.

3. The magneto-inductive flow measuring device as claimed in claim 1, wherein:
    said middle segment has at least two oppositely lying planar surfaces, which act as bearing surfaces for said magnet system.

4. The magneto-inductive flow measuring device as claimed in claim 1, wherein:
    said at least two plates are planar.

5. The magneto-inductive flow measuring device as claimed in claim 4, wherein said plates are of metal.

6. The magneto-inductive flow measuring device as claimed in claim 3, wherein said plates extend beyond the planar surfaces at least in certain regions.

7. The magneto-inductive flow measuring device as claimed in claim 4, wherein said plates are connected with one another by means of bolts.

8. The magneto-inductive flow measuring device as claimed in claim 1, wherein:
    said tube holder completely encloses said middle segment.

9. The magneto-inductive flow measuring device as claimed in claim 1, wherein:
    said measuring tube is composed of polyethylene, polyamide, polypropylene and/or polyvinyl chloride.

10. The magneto-inductive flow measuring device as claimed in claim 1, wherein:
    each of said plates has a thickness, which corresponds at least to the wall thickness of the measuring tube.

11. The magneto-inductive flow measuring device as claimed in claim 1, wherein:
    only said planar plates are arranged between said magnet system, that is between said field coils, and said measuring tube.

12. The magneto-inductive flow measuring device as claimed in claim 1, wherein:
    said middle segment has a minimum diameter dmin and a maximum diameter dmax; and
    dmin is at least 20% smaller, and at least 50% smaller, than dmax.

13. A method for manufacturing a measuring tube for a magneto-inductive flow measuring device,
    said measuring tube is a plastic tube, and
    has inlet and outlet regions with a first cross section; and
    said measuring tube has between the inlet and outlet regions a middle segment, which has a second cross section, wherein measuring electrodes are arranged in said middle segment of said measuring tube,
    said middle segment is surrounded at least in the region of said measuring electrodes by a tube holder, which guards against cross-sectional deformation of said second cross section, wherein said tube holder is composed of at least two plates, wherein:
said second cross section is established by deformation of said measuring tube,
said deformation is established by pressing said measuring tube against a plug under exposure to heat; and
said guarding against cross-sectional deformation of said second cross section is established by connecting the at least two plates with one another.

\* \* \* \* \*